US005234743A

United States Patent [19]

Fleischle

[11] Patent Number: 5,234,743

[45] Date of Patent: Aug. 10, 1993

[54] PRESS PLATE WITH A UNIFORM FLAT EASILY-REPAIRABLE PRESS SURFACE AND PROCESS FOR MAKING SAME

[76] Inventor: Rudolf Fleischle, Allee 10, 7129 Brackenheim, Fed. Rep. of Germany

[21] Appl. No.: 732,505

[22] Filed: Jul. 18, 1991

[30] Foreign Application Priority Data

Jul. 25, 1990 [DE] Fed. Rep. of Germany ....... 4023566

[51] Int. Cl.$^5$ ....... B32B 3/00

[52] U.S. Cl. ....... 428/195; 101/126; 427/386; 428/339; 428/413

[58] Field of Search ....... 427/386; 101/126; 428/195, 419, 339

[56] References Cited

U.S. PATENT DOCUMENTS 4,379,039 4/1983 Fujimoto et al. ....... 427/54.1 X
4,528,909 7/1985 Rigg et al. ....... 427/386 X
4,557,994 12/1985 Nagano et al. ....... 430/162
4,859,571 8/1989 Cohen et al. ....... 427/302 X

*Primary Examiner*—Michael Lusigan
*Attorney, Agent, or Firm*—Michael J. Striker

[57] ABSTRACT

The process for making a press plate having a flat press surface includes applying a liquid synthetic epoxy resin plastic material to a support surface of the press plate; allowing the liquid synthetic epoxy resin plastic material to run freely under action of gravity until it is uniformly distributed on the support surface and a layer with a flat and horizontal surface is formed on the liquid synthetic epoxy resin plastic material; providing projecting support walls along edges of the support plate for retaining and preventing loss of the liquid synthetic epoxy resin plastic material; and allowing the liquid synthetic epoxy resin plastic material to harden without vibration for up to seven days. The liquid synthetic epoxy resin plastic material is hardenable so that the press surface formed on the layer has sufficient hardness and the liquid synthetic epoxy resin plastic material is sufficiently elastic to compensate for expansion of the support plate, while retaining a flat smooth press surface. The press plate consists of the support plate and the single hardened layer, which is resistant to temperatures up to 150° C., resistant to attack by solvents and is mechanically workable.

37 Claims, 1 Drawing Sheet

Fig.1
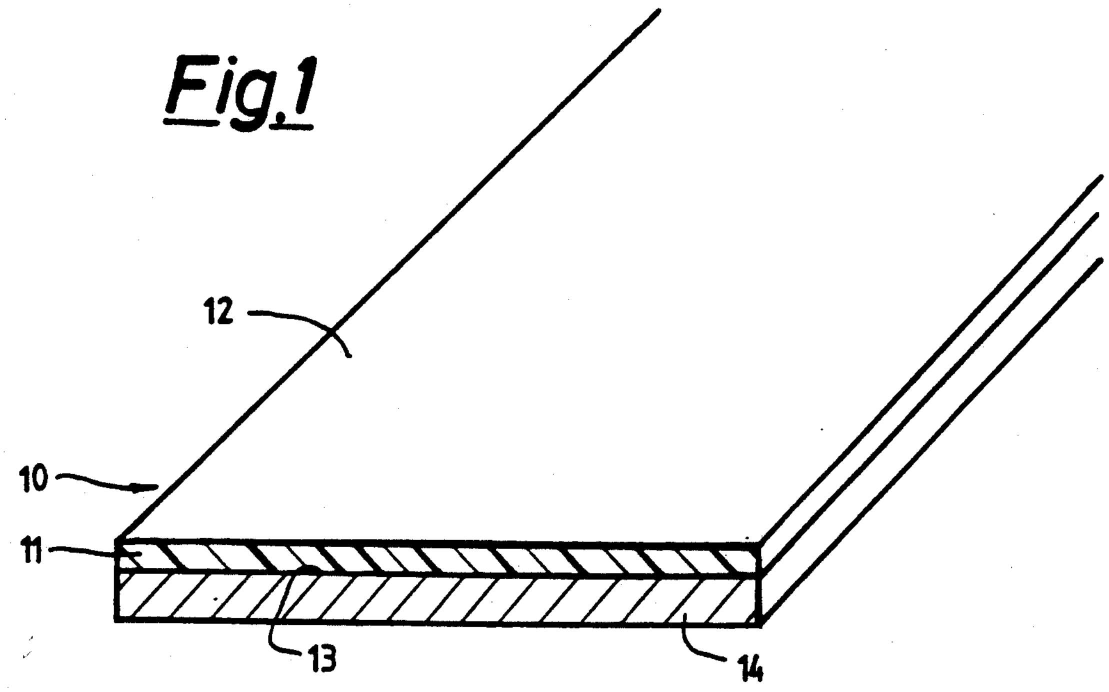
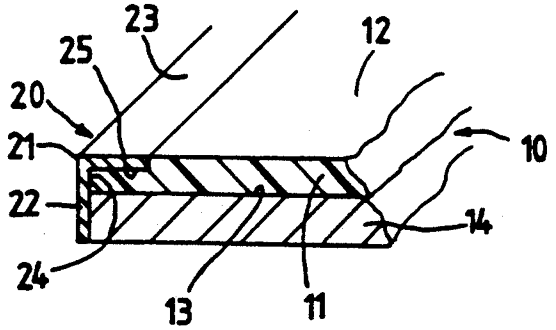
Fig.2

PRESS PLATE WITH A UNIFORM FLAT EASILY-REPAIRABLE PRESS SURFACE AND PROCESS FOR MAKING SAME

BACKGROUND OF THE INVENTION

The present invention relates to a process for making a uniform flat, and especially a large, press plate, particularly for a screen printing platen.

In a screen printing machine with a stationary press member (screen) and a movable wiper element, a stationary press platen is provided for support of the materials to be printed, e.g. stuff, glass, enamel surfaces and the like. This press platen is, for example, movable for proofing. It has on its upper side a press contacting or pressing surface, which must be flat to guarantee a high quality screen printing. In the known screen printing machine, the press plate of the press platen is made of metal, particularly from eloxated aluminum. In making of a vacuum press platen, the press plate is formed as a vacuum press plate, which contains a plurality of throughgoing holes or perforations. Also in case of the vacuum press plate the press plate can be made of metal, particularly eloxated aluminum. This type of press plate is above all heavy in large sized machines, expensive and delicate regarding its flat surfaces. In operation, damage of the press surfaces can not be prevented. Then it is necessary to repair the press surface of the press plate, i.e. to make it uniformly flat and to eloxate it as needed. This is expensive and requires much effort. Moreover, this procedure takes a certain time interval, in which the screen printing machine cannot be used, so that, above all, this causes a certain idle or down time, which is considerably disadvantageous.

Press plates are known which have thin formica layers glued to their surfaces. These formica layers are hard, sensitive and brittle so that they are very easily damaged. Repair of these surfaces is not possible, because in a very time consuming and expensive process the formica layers which are damaged must be first removed from the support plate, the remaining formica regions on the press plate being easily broken and very difficult to remove. In this case the new press plate must also be mounted in the press which is also expensive and difficult. Here also there is no guarantee that the surface of the press plate maintains its high quality. For both types of the known press plate, the danger exists that scratch-sensitive workpieces to be printed, e.g. glass plates, enamel surfaces, and the like, can be comparatively easily scratched. Also the surface of this kind of press plate is, for its part, also very scratch sensitive.

A screen printing platen with a press plate mounted on a frame for holding a workpiece to be printed is known from German Published Patent Application 38 23 853, in which the surface of the press plate is covered by an adhesive plastic foil. Because of this plastic foil, damage to the press plate can be avoided. The plastic foil should, be easily replaceable, when it is damaged. Also the replacement of the plastic foil is inexpensive and does not take much time. However the foil fits and follows the surface of the support plate, so that no flat surface is formed, as is required by the printing process, if there were nonflat regions on the press plate. Also the danger exists that the plastic foil is easily and quickly loosened from the press plate, especially under the action of temperature, solvent and/or mechanical forces.

SUMMARY OF THE INVENTION

It is an object of the present invention to provide a process for making a flat, and particularly large, press surface, particularly for a screen printing platen, which has a high degree of planarity, which is comparatively simple and requires only a comparatively short time to produce a product having the desired requirements.

It is also an object of the present invention to provide a press plate with a flat press surface, particularly suitable for screen printing platens, which is easily and quickly repaired, is uniformly flat and requires only a comparatively short time to produce.

According to the invention, the press plate with the flat press surface is made by a method including applying a liquid easily flowable synthetic resin plastic material to a support surface of support plate of the press plate and allowing the liquid synthetic resin plastic material to harden to form a hardened layer having the press surface.

Advantageously, the liquid synthetic resin plastic material is spread or poured on the support surface. This liquid synthetic resin plastic material can be distributed on the support surface and can run free so as to be distributed uniformly under the action of gravity so that its support surface becomes flat and horizontal. To aid the formation of a flat press surface, the edges of the support surface can be provided with projecting lateral walls, which prevent the liquid resin plastic from flowing away. These walls may be removed after 3 to 4 days of hardening. The laterals walls may have adhesive strips for this purpose or be formed by edge strips.

The preferred thickness for the hardened layer of resin plastic is at least 3 mm.

The synthetic resin plastic material must, on the one hand, form a layer of sufficient hardness on cooling and, on the other hand, have sufficient flexibility or elasticity to compensate for the thermal expansion of the support surface material. The hardened layer may be a colored material and must have a sufficiently low viscosity when liquid. It must be mechanically workable, stable at temperatures up to 150° C. and resistant chemically to attack by various solvents. The resin plastic material can be applied to a metal, wood, plastic or composite or sandwich support surface material.

The liquid synthetic resin plastic material may be an epoxy resin.

The resin plastic material must harden in seven days with the presence of vibration or shocks. Air bubbles present on the surface are removed after a predetermined time after application of the resin plastic material to the support surface. The predetermined time is advantageously about 30 minutes with application of external heat, preferably by application of a flame or hot air.

Because of the above method according to the invention, a liquid and easily flowable resin plastic material is applied to the support surface and allowed to harden. Very quickly, easily and economically a liquid surface is formed on the support surface with a comparatively large size, which is uniformly flat to a high degree, because of the action of gravity as long as vibration and shocks are not present. This surface formation is similar to the formation of a surface of water, when a portion of water is poured into a trough. Similarly, the liquid synthetic plastic material behaves like the water and, when it is applied to the support surfaces flows over it until it reaches the projecting lateral walls, which prevent its flowing away, so that the lateral walls and the support surface act as a trough for the liquid synthetic plastic material which forms the flat horizontal press surface surface. Naturally the resin plastic material must remain liquid long enough and flow fast enough, so that the uniform flat surface forms prior to hardening to form the hardened layer.

This procedure guarantees a surface with a high degree of planarity after hardening, and of course having a large size, which can be 2000×4000 mm. As a plastic material, epoxy is suitable, which is simultaneously effective as an adhesive means, so that after hardening the layer arising is firmly adhering on the support surface of the support plate. Unless the plastic material used to make the press surface has sufficient hardness and at the same time sufficient elasticity to compensate for the change in dimension of the support surface material, tears or other damage may arise in the press surface on the hardened layer on the press plate and the adherence between the surface layer of the press surface layer and the support surface may be lost. Because of the hardness and other properties described above, the press surface layer made from the synthetic resin plastic material is not easily damaged and the adherence with the support surface is maintained. Surface damage of the press surface is very quickly, economically and simply repaired, since the damaged portion is molded with suitable synthetic resin plastic material. Because of that, the lifetime of the press plate and its effectiveness is increased. The press surface formed by the layer has the advantage that scratch sensitive materials to be printed, e.g. glass plates, enamel plates or the like, cannot be scratched.

Our invention also includes a press plate having an improved press surface, particularly for a screen printing platen, which is made by the above described process. According to the present invention, the press plate comprises a support plate having a support surface and a hardened synthetic plastic resin layer adhering uniformly on the support surface. The hardened layer provides the press surface which is uniform and flat.

Advantageously, the hardended layer formed in the above process is resistant to heat up to a temperature of 150° C., resistant to attack by various solvents and is workable mechanically. It has a thickness of at least 3 mm and may be colored. Other features of the layer have already been described in relation to the process above.

BRIEF DESCRIPTION OF THE DRAWING

The objects, features and advantages of the present invention will now be illustrated in more detail by the following detailed description, reference being made to the accompanying drawing in which:

FIG. 1 is a schematic partially cross-sectional, partially perspective view of a press plate according to a first embodiment of the present invention; and FIG. 2 is a schematic partially cross-sectional, partially perspective view of a press plate according to a second embodiment of the present invention.

DETAILED DESCRIPTION OF THE INVENTION

In FIG. 1 a press plate 10 according to the invention is shown schematically which is designed for use in a screen printing platen. The press plate 10 is thus, e.g. the press plate of a press platen, as in a screen printing machine, which operates according to the already known surface pressure method. The press plate 10 is mounted, e.g. exchangeable on an unshown frame of a press platen. It can be demounted and treated, for example for repair work and other reasons.

The features of the press plate 10 include a hardened layer 11 on its upper side, which has a press surface 12, which is uniform and flat to a high degree, which forms the press surface in certain applications in the screen printing machine. The hardened layer 11 is made of a synthetic resin plastic material, which is applied to the support surface 13 and hardened. This hardened layer 11 adheres uniformly to the support surface 13 compensating for the surface irregularities of the support surface, especially dimensional and/or shape variations of the flat surface. The flat press surface 12 of the layer 11 is very uniform and highly flat. The press plate 10 is advantageously large size. It can be dimensioned so large that, e.g. a press format of 2000×4000 mm is possible with the screen printing machine. Inspite of the large size of the press plate 10 the surface 12 is uniformly flat.

The press surface 12 in the vicinity of certain imperfections and damage sites, which develop during the course of its use, repairable and may be made uniformly flat again by application of a liquid synthetic resin plastic material from which the layer 11 is made and allowing that material to flow under gravity to form a level surface and to harden. Thus the press plate 10 can be repaired rapidly, easily and economically.

The layer 11 is temperature resistant up to about 150° C., resistant to attack by solvent and can be easily worked mechanically. The good mechanical properties have the advantage that the layer 11 can be worked after hardening, particularly at its edges, and then, when the press plate is formed as a vacuum press plate, the perforations required for the vacuum, especially the throughgoing holes, can be made without problem. Since in this case more than 10000 holes are present in the vacuum press plate, this is a considerable advantage. The layer 11 may be colored in a desired color, so that it puts down a color. The layer thickness of the layer 11 is at least arbitrary in its size. It is advantageous when the thickness of the layer 11 amounts to at least about 3 mm. The layer 11 is on the one hand sufficiently hard and on the other had sufficiently elastic so that expansion of the material of the supporting surface 13, e.g. because of mechanical forces, temperature conditions or the like, can be satisfactorily compensated without deviations of the surface from a plane.

The layer 11 is applied to a support plate 14 having a support surface 13, which is made of metal, e.g. steel or particularly aluminum, or instead from wood, a chipboard, a panel having a sandwich or composite structure, a panel made from plate and the like. The hardened layer 11 is held fixed on the support plate 14 permanently, and of course by the adhesive action of the applied and hardened synthetic resin plastic. Advantageously this layer is made from epoxy resin. In a first example in FIG. 1, the edges of the press plate 10 are not provided with special edge devices. In the second embodiment in FIG. 2, in contrast, an edge protecting member 20 is provided on the edges of the press plate 10. The edge protecting member 20 overlaps the layer 11 in the vicinity of the edge and closes the surface 11 flush with the surface 12. The edge protecting member 20 is formed, e.g., by an angle section 21, which covers with a leg 22, a lateral side of the press plate 10 and whose other leg 23 overlaps the edge of the layer 11 outside of the region of pressing. Because of that, not only an edge protecting member 20 and a neat edge closure are provided, but the angle section 21 on the edge can simultaneously form a support surface or lateral support wall 24 and/or 25 in the vicinity of the leg 22 and the leg 23 for the applied still liquid synthetic resin plastic material. After hardening of the resin plastic material, the adhesive action of it is enough to hold the angle section 21 in place.

A process for making a flat large press surface 12 on a press plate, particularly for a screen printing platen, can be explained by consulting FIGS. 1 and 2. The support plates 14 can be of the above described kind. However a new type of support plate may be used instead of these, for example, in the case of a repair, a support plate 14, which should be provided on its upper surface with a suitable flat surface.

In this process, one applied to the support surface 13 a liquid and easily flowable resin plastic material, e.g. epoxy resin, and allows it to harden free of vibration for up to 7 days. Thus, one allows the resin plastic material applied to the support surface 13 to run free on the support surface 13 and become distributed uniformly over it. As desired, the distribution after application of the plastic material can be accelerated by a strip or rod, which is moved over the support surface 13. The liquid resin plastic material is applied to the support surface 13, so that the liquid is distributed on it, by pouring, for example. Similarly, an application is also possible, e.g. by spraying on, suction of the plastic material by vacuum through an intervening space of the like formed between a covering foil and the support surface 13. It is important that the applied liquid resin plastic material flow and automatically under the force of gravity its upper surface may then become plane or flat and horizontal. Since the applied liquid resin plastic material flows easily, this is distributed over the entire support surface, so that on the upper side of the still liquid cooling plastic material a highly flat surface arises because of gravity, similar to the situation in the case of the described example with water.

For this projecting lateral supporting walls can be formed along the edges of the support surface 13, e.g. by the edge protecting members 20 in the shape of the angle sections 21, which prevent the liquid plastic material from flowing away. These projecting supporting surfaces form a wall-side projecting shell like structure, which together with the support surface 13, forms a through, in which the easily flowable resin plastic material is poured.

When a layer thickness of at least 3 mm is desired for the layer 11 arising after hardening, one fills a suitable quantity of liquid resin plastic material in this through, so that a suitable liquid level of about at least 3 mm is reached.

In regard to the resin plastic material, one selects a material, which has a suitably low viscosity so that it flows sufficiently. Further one chooses a material, e.g. the mixture proportions, so that the layer 11 after hardening, on the one hand, has sufficient hardness, e.g. for pressing, and, on the other hand has sufficient elasticity, so that the layer 11 can compensate the expansion and contraction of the support plate 14, which, e.g., result from mechanical forces, temperature and other factors. The layer 11 has, in every case, a different coefficient of expansion of the material of the press plate 10. Without the appropriate elasticity, the layer 11 looses its high degree of flatness or planarity and the layer 11 can thus be loosened from the support surface 13 in an undesirable way. Furthermore, the layer 11 adheres because of the inherent adhesive properties of the plastic material chosen uniformly and permanently fixed to the support surface 13, since the plastic material is simultaneously effective as a glue or adhesive.

When it is desired that the layer 11 be colored, the synthetic resin plastic material can be colored prior to application on the support surface 13 by introducing a pigment, dye or the like. It is advantageous when one applied a synthetic resin plastic material whose hardened layer 11 is easily workable mechanically, resistant to solvent attack and resistant to heating up to a temperature of 150° C. The good mechanical workability of this layer is particularly advantageous when one introduces perforations and/or holes in the layer 11 and the support plate 14 under it after hardening of the synthetic resin plastic material, i.e. so as to form the press plate as a vacuum press plate. Also in each case it is desirable to be able to work the edges of the surface 12 of the layer 11 mechanically to make the upper sides of these edges flat.

Also, when a support plate 14 is shown in the Example of FIG. 1 and 2, a support plate 14 is shown, which, for making several large size press plates 10, can be made by bonding several support plates 14 rigidly one on the other. Then, after bonding the support plates 14 one to each other, the liquid synthetic resin plastic material is applied to the support surface 13 of one such composite support plates, so that it runs freely over the support surface and uniformly over the positions forced through the individual support plates. Thus also in this case no depressions, grooves and/or troughs arise in the vicinity of the forced through locations of the finished product, so that also in this case a high degree of planarity is attained in this way.

Also, when one allows liquid synthetic resin plastic material applied to the support surface 13 to harden without vibration for up to seven days, it is possible to remove the projecting edge supporting walls after about three to four days hardening time, in as much as one is not using these supporting walls, as indicated in FIG. 2, to form edge closing elements, i.e. edge protecting members 20, and after hardening they are removed from the synthetic resin plastic material.

It has proven extraordinarily simple and sufficient, when these projecting edge supporting walls are formed by edge strips, adhesive bands and the like economical elements, which can be later easily removed.

Additional process steps can be useful as described in the following. The formation of air bubbles in the plastic material during the method is unavoidable. It can be advantageous, when, after application of the synthetic resin plastic material and after the predetermined time, e.g. about 30 minutes, the air bubbles present in the surface of the plastic material are removed. The air bubble removal is necessary, since air located in the deeper portions of the plastic material forms air bubbles there and rises to the surface. These surface air bubbles can be advantageously removed, when heat is applied to the surface, e.g. by warm air and open flame. Because of that, the air contained in the air bubbles is heated. The expansion has the effect of bursting of the air bubbles with loss of air. The edge material around the air bubble flows, since it is still liquid and flows back easily resulting in a surface 12, which is flat.

The support plate 10 made in this way with the layer 11 of plastic material has various already set forth advantages. Because of the material from which this layer 11 is made, a scratch-sensitive material to be printed, e.g. glass plates, enamel and the like, is not scratched when it is brought into contact with the surface 12. The layer 11 is quickly, easily and economically improved and repaired. Because of that, a press plate 10 can be used after repair, so that the making of a new press plate and the associated idle time as well as the required high costs can be avoided. Also existing press plates in screen printing machines, with which the press surface is formed in other ways, can be repaired according the the process of the invention, improved or equipped with a new layer corresponding to layer 11 with the improved flat surface 12. One can also here reuse the existing press plates and a new press plate or a completely new screen printing machine is not required. The press plate 10 according to the invention and the described process make it possible in a simple economical way to provide a large size press plate 10 and also to guarantee that its surface 12 is flat and uniform over its entire surface. It is not necessary to completely rework the surface mechanically. When one forms the projecting supporting walls by a shell structure, the entire press plate is always usable again and can be repaired.

While the invention has been illustrated and described in a process for making a press plate with a flat press surface, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Process for making a press plate having a flat press surface, said process comprising the steps of:

a. applying a hardenable liquid synthetic epoxy resin plastic material, having a viscosity low enough so that said liquid synthetic epoxy resin plastic material flows and runs freely, to a support surface on a support plate of the press plate, said applying including distributing the liquid synthetic epoxy resin plastic material on the support surface and allowing the liquid synthetic epoxy resin plastic material to run freely on said support surface under action of gravity until a flat and horizontal surface is formed on the liquid synthetic epoxy resin plastic material, and b. allowing said liquid synthetic epoxy resin plastic material to harden and to form a hardened layer, said hardened layer being formed with a flat press surface on the support plate, wherein said hardened layer has sufficient hardness and is sufficiently elastic to compensate for expansion of the support plate and is being resistant to temperatures up to a temperature of 150° C.

2. Process according to claim 1, wherein said applying includes spreading the liquid synthetic epoxy resin plastic material on the support surface.

3. Process according to claim 1, wherein said applying includes pouring the liquid synthetic epoxy resin plastic material on the support surface.

4. Process according to claim 1, further comprising providing projecting support walls along edges of the support surface of the press plate, said supporting walls retaining and preventing loss of said liquid synthetic epoxy resin plastic material.

5. Process according to claim 1, wherein the hardened layer is at least 3 mm thick.

6. Process according to claim 1, further comprising introducing a pigment material into the liquid synthetic resin plastic material.

7. Process according to claim 1, said hardened layer formed from said liquid synthetic epoxy resin plastic material is resistant to attack by solvent.

8. Process according to claim 1, said hardened layer formed from said liquid synthetic epoxy resin plastic material is workable mechanically.

9. Process according to claim 1, further comprising the step of providing the hardened layer and the supporting surface under the hardened layer with a plurality of holes.

10. Process according to claim 1, wherein said support plate is made from a material selected from the group consisting of metal, wood, and plastic.

11. Process according to claim 1, wherein said support plate is made from a plurality of support plate portions stacked one on the other so that said support plate is inflexible.

12. Process according to claim 1, wherein the liquid synthetic epoxy resin plastic material is allowed to harden for up to seven days.

13. Process according to claim 1, wherein said step of allowing to harden proceeds without vibration.

14. Process according to claim 1, wherein air bubbles are present in said liquid synthetic epoxy resin plastic material during the applying and further comprising, after a certain predetermined time after said applying, removing said air bubbles from said liquid synthetic epoxy resin plastic material.

15. Process according to claim 14, wherein said certain predetermined time amounts to about 30 minutes.

16. Process according to claim 14, wherein said removing includes applying heat by one of applying a flame to said plastic material and applying hot air to said plastic material.

17. Process according to claim 4, including removing said projecting supporting walls after 3 to 4 days.

18. Process according to claim 4, including removing said projecting supporting walls after hardening of said liquid synthetic resin plastic material.

19. Process according to claim 4, wherein said projecting supporting walls are one of edge strips and adhesive strips.

20. Process for making a press plate having a flat press surface, said process comprising the steps of:

a. applying a liquid synthetic epoxy resin plastic material to a support surface of a support plate of the press plate;

b. allowing the liquid synthetic epoxy resin plastic material to run freely on said support surface under action of gravity until said liquid synthetic epoxy resin plastic material is uniformly distributed on said support surface and a layer with a flat and horizontal surface is formed on the liquid synthetic epoxy resin plastic material;

c. providing projecting support walls along edges of the support plate, said supporting walls retaining and preventing loss of said liquid synthetic epoxy resin plastic material; and d. allowing said liquid synthetic epoxy resin plastic material to harden without vibration for up to seven days to form a hardened layer with said press surface, wherein said liquid synthetic epoxy resin plastic material is hardenable so that said press surface of said hardened layer has sufficient hardness and is sufficiently elastic to compensate for expansion of the support plate and is resistant to heat up to a temperature of 150° C.

21. Press plate, consisting of a support plate having a support surface and a single hardened layer of synthetic epoxy resin plastic material on the support surface, said epoxy resin plastic material having adhesive properties such that said hardened layer uniformly adheres to said support surface, and wherein said hardened layer has a uniform, flat press surface, said hardened layer is repairable by application of the synthetic epoxy resin plastic material in liquid state to the hardened layer, said hardened layer is sufficiently elastic so as to compensate for expansion of the support material and said hardened layer is resistant to temperatures up to 150° C. and attack by solvents and is mechanically workable.

22. Press plate according to claim 21, wherein said hardened layer is at least 3 mm thick.

23. Press plate according to claim 21, wherein said hardened layer is colored.

24. Press plate according to claim 21, wherein said support plate comprises at least one support plate portion made from a material selected from the group consisting of wood, metal and plastic.

25. Press plate according to claim 24, wherein said support plate includes a plurality of support plate portions placed on each other and rigidly bonded together.

26. Press plate according to claim 21, further comprising edge protecting members provided on the edges of said press plate.

27. Press plate according to claim 26, wherein said edge protecting members overlap the layer in the vicinity of the edges of the press plate and are flush with the press surface.

28. Press plate according to claim 26, wherein said edge protecting member is formed by an angle section.

29. Press plate according to claim 21, wherein said press plate has a size of at least 2000×4000 mm.

30. Press plate according to claim 21, wherein said press plate is a vacuum press plate having a plurality of holes therein.

31. Press plate made by a process comprising the steps of:

a. applying a liquid synthetic epoxy resin plastic material on a support surface of a support plate;

b. allowing the liquid synthetic epoxy resin plastic material to run freely on said support surface under action of gravity until said liquid synthetic epoxy resin plastic material is uniformly distributed on said support surface and a flat and horizontal surface is formed on the liquid synthetic epoxy resin plastic material;

c. providing projecting support walls along edges of the support plate, said supporting walls retaining and preventing loss of said liquid synthetic epoxy resin plastic material; and d. allowing said liquid synthetic epoxy resin plastic material to harden without vibration for up to seven days to form a single hardened layer on the support surface thus providing a press plate consisting of the support plate and the single hardened layer having a press surface, wherein said liquid synthetic epoxy resin plastic material is hardenable so that said press surface of said hardened layer has sufficient hardness, is repairable by application of an additional portion of the liquid synthetic epoxy resin plastic material to the press surface, is resistant to temperatures up to 150° C., is resistant to attack by solvents and is mechanically workable, is sufficiently hard so as to provide the press surface and is sufficiently elastic to compensate for expansion of the support plate.

32. Press plate according to claim 31, wherein said hardened layer is at least 3 mm thick.

33. Press plate according to claim 31, wherein said support plate comprises at least one support plate portion made from a material selected from the group consisting of wood, metal and plastic.

34. Press plate according to claim 33, wherein said support plate includes a plurality of support plate portions placed on each other and rigidly bonded together.

35. Press plate according to claim 31, further comprising providing edge protecting members provided on edges of said press plate.

36. Press plate according to claim 35, wherein said edge protecting members overlap the layer in the vicinity of the edges of the press plate and are flush with the press surface.

37. Press plate according to claim 35, wherein said edge protecting member is formed by an angle section.

* * * * *